United States Patent [19]

Kaak

[11] Patent Number: 4,662,509

[45] Date of Patent: May 5, 1987

[54] CHAIN CONVEYOR

[76] Inventor: Stephanus W. Kaak, Varsseveldseweg 20a, 7061 GA Terborg, Netherlands

[21] Appl. No.: 824,419

[22] Filed: Jan. 31, 1986

[30] Foreign Application Priority Data

Feb. 7, 1985 [NL] Netherlands ............ 8500342

[51] Int. Cl.$^4$ ............................................. B65G 17/32
[52] U.S. Cl. .................................... 198/792; 198/831; 198/851
[58] Field of Search ................ 198/831, 844, 851, 792

[56] References Cited

U.S. PATENT DOCUMENTS

| | | | |
|---|---|---|---|
| 3,889,803 | 6/1975 | White ............................. | 198/823 |
| 3,991,876 | 11/1976 | Schmidt, Sr. et al. ............ | 198/831 |
| 4,030,595 | 6/1977 | McCombie ........................ | 198/844 X |

*Primary Examiner*—Andres Kashnikow
*Attorney, Agent, or Firm*—Zarley, McKee, Thomte, Voorhees & Sease

[57] ABSTRACT

The invention relates to a chain conveyor, provided with a drive chain and with carriers mounted on the chain, said carriers being mounted on the links of the chain. According to the invention each carrier consists of a rigid, rod-shaped element being at one end pivotably mounted on a chain link and being at a distance from the chain, pivotably connected to a pulling element which is pivotably connected at its other end to a chain link, being situated at a distance from the first-mentioned chain link, in such a manner that a triangular carrier is formed, and that the basis along the chain of adjacent triangular carriers partially overlap each other.

10 Claims, 9 Drawing Figures

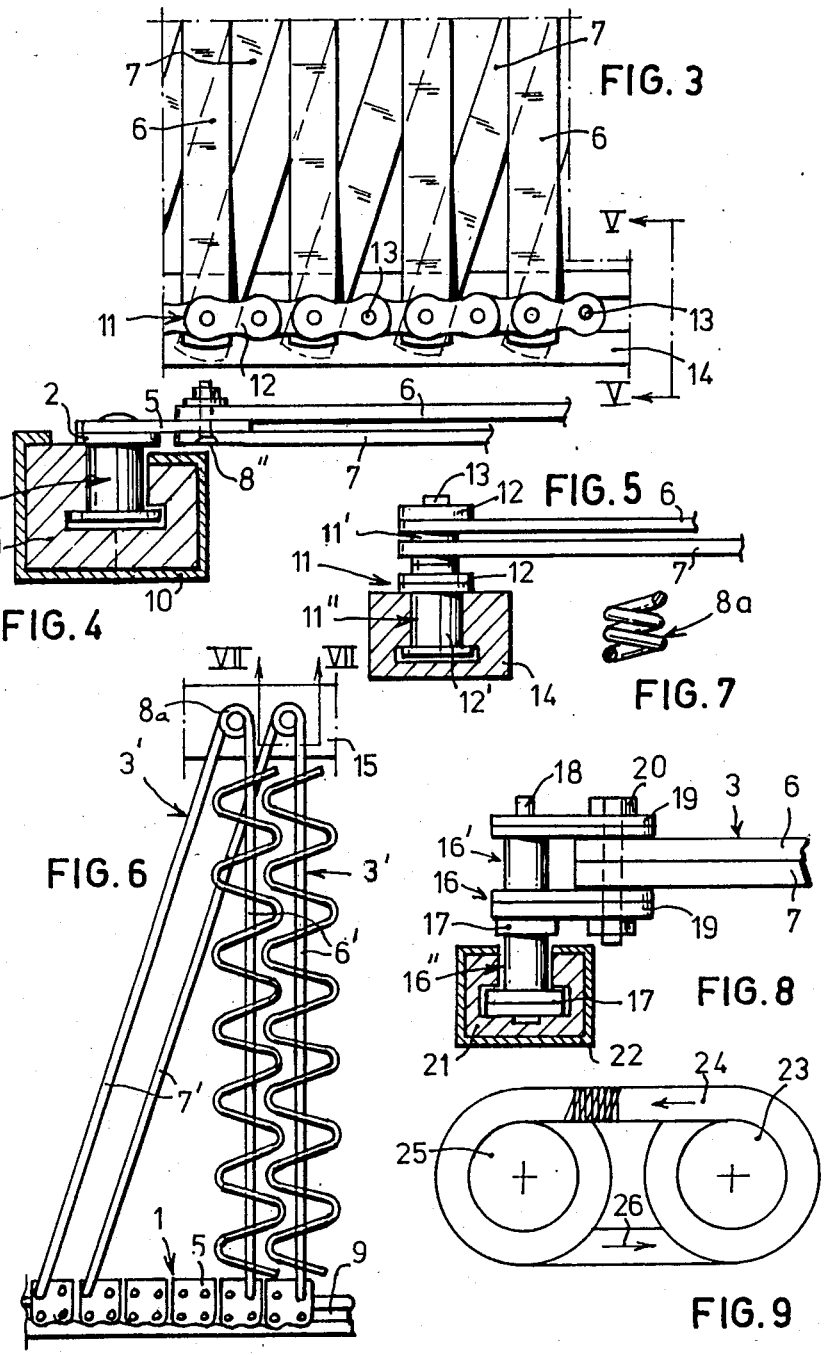

CHAIN CONVEYOR

The invention relates to a chain conveyor, provided with a drive chain and with carriers mounted on the chain, said carriers being mounted on the links of the chain.

From numerous brochures of conveyor system manufacturers, chain conveyors of this type are known, in which the carriers, being transversely to the chain, have been mounted approximately in the center of the chain. With this known chain conveyor, when turning a curve, the ends of the carriers move towards one another on the inside of the curve, and away from one another on the outside of the curve. This means that the products have to be placed at a certain distance, the pitch, from one another, in order to provide ample space between the products. If this pitch is not applied, then the products are pressed against one another on the inside of the curve, which causes them to move in a transverse or radial direction towards the outside of the curve, during which they could even fall off the conveyor. Another drawback of this known chain conveyor is that the products, when said conveyor is installed in a freezing plant, could freeze together if they are not lying with sufficient pitch on the carriers. Due to this pitch which has to be applied, this known conveyor has a relatively unfavourable occupation rate.

Furthermore a conveyor belt is known from one of applicant's brochures, i.e. the so-called Multispiral Tower, which is arranged in the form of a helical line as a vertical cylinder and which consists of carriers being pivotably connected to one another in a plane perpendicular to the conveying plane, said carriers lying at a fixed distance from one another on the outside and being movable towards and away from one another on the inside, in order to be able to follow the helical line. The pivot of the carriers thus lies on the outside of the helical line, so that the conveyor belt is shifted together on the inside of said helical line. Therefore, this known conveyor belt has the same drawbacks as the above-described chain conveyor.

The conveyor belt is driven by a separate motor, exerting a pulling force on a chain mounted on the outside of the belt and is taken along with a driven cylinder having vertical rods, which press against the inside of the helically shaped conveyor belt, and which take along the conveyor belt while exerting frictional forces.

Because the conveyor belt is shifted together on the inside near the cylinder, the belt can only be conveyed, when the pulling force in the chain on the outside of the belt and the driving speed of the cylinder, about which the belt has been wound, correspond to each other. This requires a very critical drive, since the belt construction is instable in its shifted together condition.

A conveyor, consisting of a joined series of partially overlapping carrier plates, being transversely to the direction of conveyance and being connected to one another near both the ends by chain link-shaped driving and guiding means is also known. When this known conveyor has to turn a curve, the carrier plates on the inside of the curve are pressed towards each other and they overlap one another there over a greater surface, whereas the chain links alternately pivot inwardly and outwardly. In this known conveyor too, the products are pressed towards one another on the inside of the curve so that the same problems and drawbacks can arise as with the above-discussed first chain conveyor.

Finally a chain conveyor is known, in which transverse rods have been mounted perpendicularly to the chain links, said rods extending outwardly from the chain. The free extremities of the transverse rods rest on rails. When the conveyor moves through a curve, the free extremities of the transverse rods move away from one another first and then towards one another. Although this known chain conveyor has a far better occupation rate than the above-described first chain conveyor, with which the system can get a reduced length, this chain conveyor has the drawback, that the chain links can only exert a small entrailing moment on the transverse rods, so that these tend to drop behind on their free extremities due to frictional forces, whereby in the horizontal plane of the chain a torque is exerted, due to which the chain can be seized or at least get an irregular movement.

The invention aims at removing the drawbacks of the above-described conveyors and at the same time maintaining their advantages.

This object is attained in that, according to the invention, every carrier consists of a rigid, rod-shaped element, being at one end pivotably mounted on a chain link and being, at a distance from the chain, pivotably connected to a pulling element, that at its other end is pivotably connected to a chain link lying at a distance from the first-mentioned chain link, in such a manner that a triangular carrier is formed, and in that the bases of adjacent triangular carriers along the chain partially overlap each other.

The result of applying these measures is that on the one hand the rigid, rod-shaped elements can be placed very close to one another, viz. one on every link, while the spaces between the rigid rod-shaped elements are still partially covered by the pulling elements, the number of which is equal to that of the rigid, rod-shaped elements and each of which has also been connected to a chain link, so that even very small products can be conveyed, and that on the other hand the pulling elements exert a pulling force on the extremities of the rigid, rod-shaped elements, on account of which a great entrailing moment is exerted on the rigid, rod-shaped elements which allows conveyance of heavy objects, even through curves, without problems. The triangular carriers lie in scaled manner, which results in a stable belt structure.

The chain conveyor according to the invention has a high occupation rate, with which the products can be placed close to one another, without the danger occurring of them being pressed against one another or even being pushed off the belt when turning a curve.

In an embodiment of the chain conveyor according to the invention, the pulling element is also a rigid, rod-shaped element.

Here both the elements can be manufactured of the same stock material, which causes the conveyor to be relatively cheap. The elements can both consist of longitudinal metal strips having a small thickness with respect to their width and length.

In a particularly effective embodiment of the chain conveyor according to the invention, the pulling element is flexible and the pivot of the pulling element on the chain in the direction of movement thereof leads ahead of the pivot of the rigid, rod-shaped element on the chain.

In this embodiment the pulling element may consist of for instance a steel or nylon rope, giving the necessary pulling force.

According to the invention, the rigid, rod-shaped element and the pulling element are, at a distance from the chain, interconnected by a torsion spring.

In this embodiment, the carriers can be manufactured extremely cheaply and easily from one piece of for instance rigid steel wire, with which the torsion spring serves as a pivot. However, it is also possible to connect both the elements with a separate torsion spring.

The invention will be elucidated below on the basis of the drawing with a few embodiments.

FIG. 3 is a partial top view of another embodiment of the chain conveyor according to the invention;

FIG. 4 is a side view along line IV—IV in FIG. 1;

FIG. 5 is a side view along line V—V in FIG. 3;

FIG. 6 is a top view of a third embodiment of the chain conveyor according to the invention and FIG. 7 is a cross-section along line VII—VII in FIG. 6.

FIG. 8 corresponds to FIG. 5 and shows a side view of a fourth embodiment of the chain conveyor according to the invention; and FIG. 9 shows a schematic top view of an apparatus, in which the chain conveyor according to the invention can be applied.

Figure 1:
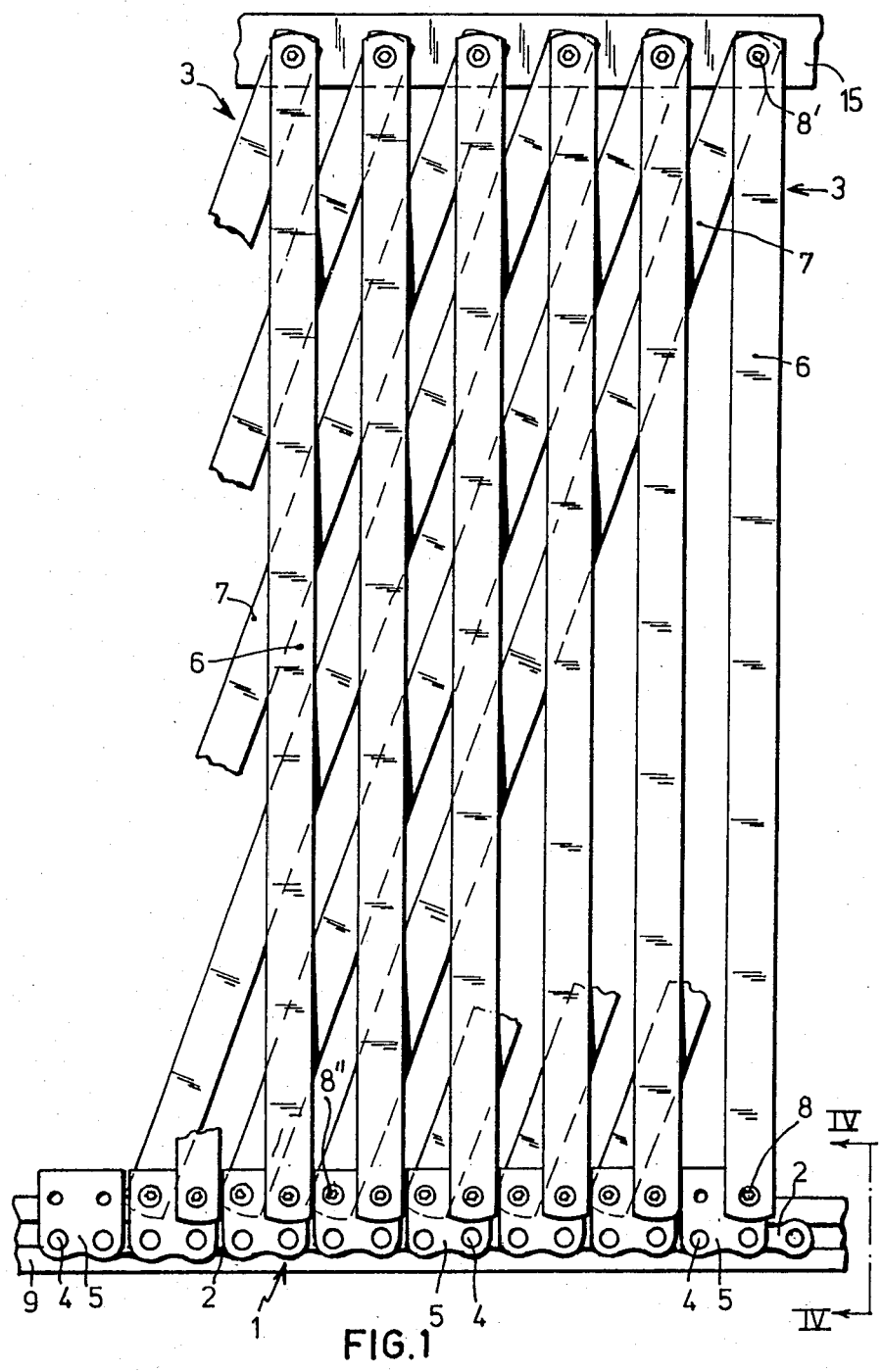
FIG. 1 is a top view of a part of a chain conveyor according to the invention in straight condition.
Figure 2:
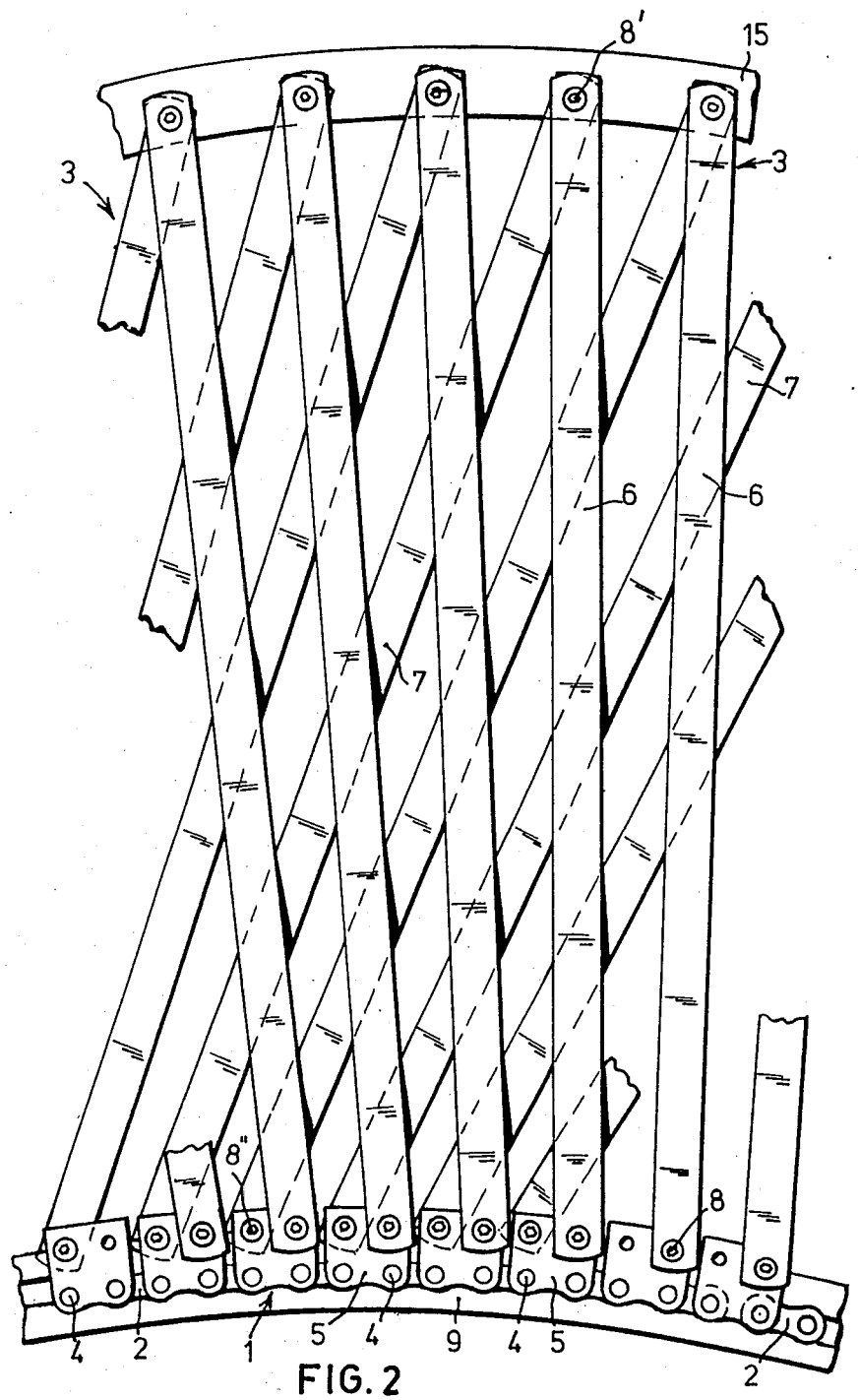
FIG. 2 show the chain conveyor according to FIG. 1 when turning a curve.

The chain conveyor according to FIGS. 1, 2 and 4 consists of a chain 1 and triangular carriers 3 mounted on its links 2. On the pivot axes 4 of the chain 1 mounting plates 5 have been mounted, which support the carriers 3. The triangular carriers 3 each consist of a rigid, rod-shaped element 6 and a pulling element 7. Each rigid, rod-shaped element 6 is pivotably mounted with its one end on the upper side of a mounting plate 5, for instance by means of a bolt 8. The other end of each rigid, rod-shaped element 6 is pivotally connected, for instance by means of a bolt 8', to the outer end of a pulling element 7, the inner end of which is pivotably connected to the bottom of the mounting plate 5, for instance by means of a bolt 8" and which in the drawn embodiment has been manufactured of the same material as the rigid, rod-shaped element 6. This material can be a metal strip having a "flat" rectangular cross-section, i.e. having a thickness which is small with respect to the width and the length of the strip. For elements 6 and 7, however, other profiles can also be applied, for instance round rod-material, tube material having any desired cross-section, and any other desired profile.

From FIGS. 1 and 2 it appears that the pulling element 7 is connected by means of a bolt 8" to a mounting plate 5 on a chain link 2, being at a distance from the chain link 2, to which the rigid, rod-shaped element 6 is connected by means of the mounting plate 5.

It also appears from the FIGS. 1, 2, 3 and 6, that the basis of the triangular carriers 3 and 3' partially overlap each other along the chain. The chain conveyor is in practice preferably executed in such a way, that on each chain link 2 a mounting plate 5 has been mounted, and that on each mounting plate the extremities of a rigid, rod-shaped element 6 and of a pulling element 7 have beem mounted. This gives the conveyor belt a relatively closed structure, even when turning a curve, as also appears from FIGS. 1 and 2.

The pulling element 7 can, according to the invention, also be flexible, with which the pivot 8" of the pulling element 7 on the chain 1 precedes the pivot 8 of the rigid, rod-shaped element 6 on the chain 1 in the direction of movement. Then the pulling element 7 only has to exert pulling forces on the rigid, rod-shaped element 6 and can consist of steel wire, nylon thread, a chain or another flexible element.

The chain 1 of the chain conveyor according to FIGS. 1, 2 and 4 is at least in the straight parts of its track guided in a plastic or metal rail 9, which may be formed from one single piece, as is indicated in FIG. 4, or from various parts, as indicated by a dashed line in FIG. 4; in which means have been applied for connecting the parts, for instance metal clips 10.

In the embodiment of the chain conveyor according to FIGS. 3 and 5 a double chain 11 has been applied having links 12, being interconnected by extended pivot axes 13. In the top part 11' of the chain 11 the chain rollers 12 have been left out, with which the bottom part 11" of the chain 11 is guided in the plastic or metal rail 14. The rail 14 may have been constructed in the same way as described on the basis of FIG. 4 for rail 9.

On the spot of the chain rollers in the top part 11" of the chain, the extremities of the rigid, rod-shaped element 6 and the pulling element 7 of the carrier 3 have been pivotably mounted, and they are, just like in the embodiment according to FIGS. 1, 2 and 4, pivotably interconnected at their other ends.

The chain conveyor according to FIGS. 3 and 5 has, just like the chain conveyor according to FIGS. 1, 2 and 4, a relatively "tight" or "closed" conveying surface, on which small objects can be conveyed. When turning a curve, as is indicated in FIG. 2, the distance between the elements 6 and 7 of the carriers 3 becomes somewhat larger indeed towards the outside, but the conveying suface remains sufficiently "tight" or "closed". The chain conveyor according to the invention has a high occupation rate because of that.

The carriers 3 can be supported on the outside by a guiding and carrying rail 15. If extremely heavy objects have to be conveyed, than the pulling elements 7 exert a pulling force on the extremities of the rigid, rod-shaped elements 6, said pulling force exerting a large entrailing moment on the element 6.

The embodiment of the chain conveyor according to the invention as drawn in FIGS. 6 and 7, can be applied for products or objects having a relatively large bottom plane. In this embodiment, the carriers 3' consist of circular, quadrangular or rectangular rod material of one piece, in which the rigid, rod-shaped element 6' and the pulling element 7' have been interconnected by a torsion spring 8a, serving as a pivot. The chain 1 is the same as the one according to FIGS. 1 and 2, as is the guide profile 9. On the chain 1 mounting plates have been mounted, on which the extremities of elements 6' and 7' have been pivotably mounted.

The parts 6', 7' and 8a of the carriers 3', according to FIGS. 6 and 7, can also be separate parts which have been interconnected by welding, brazing or the like.

As is indicated in FIG. 6, on the rigid, rod-shaped elements 6' additional elements 6a which have been bent in S-shape, wave-shape or zig-zag wise, of e.g. circular wire material or rod material, have been applied, being mounted on the crossings with the elements 6' by means of for instance spot welds.

The substantially sinusoidal elements 6a can also have a triangular rectangular of for instance oval cross-section, they can also be manufactured of tube material and they can also be connected to the rigid, rod-shaped elements 6' in another way, for instance by brazing.

By applying the substantially sinusoidal elements 6a the conveyor surface of the chain conveyor is then made "tighter" or "closer", so that products having a small bottom plane can also be conveyed.

In the embodiment of the chain conveyor according to FIG. 8, and in the embodiment according to FIGS. 3 and 5, a double chain 16 has been applied having links 17 which are interconnected by extended pivot axes 18. In the upper part 16' of the chain 16 the link plates 17 have been left out and replaced by mounting plates 19, supporting the carriers 3. In this embodiment, the carriers 3 consist also of a rigid, rod-shaped element 6 and a pulling element 7. Just like in the embodiment according to FIGS. 1, 2 and 4 elements 6 and 7 have been pivotably connected with a bolt 20 to the mounting plates 19.

The lower part 16" of the chain 16 is, just like the above embodiments, guided in its track in at least the straight parts thereof, in a plastic or metal rail 21 that, in accordance with FIG. 4, can consist of one piece or two pieces, with which in the latter case metal clips 22 have been applied.

FIG. 9 shows a schematic top view of a so-called double Multispiral Tower as mentioned on page 1, line 23 of the present description. The conveyor belt of this apparatus can be one of the chain conveyors according to FIGS. 1 through 8, it consists of one endless piece and has been provided with a driving device (not drawn) for the chain.

The chain conveyor moves in the right-hand part 23 of the apparatus helically upwardly, subsequently it moves along the arrow 24 to the left-hand side, in the left-hand part 25 of the apparatus it moves hellically downwardly and then along the arrow 26 again to the right to the right-hand part 23.

In the part of the chain conveyor on the location of the arrow 26 the driving device for the chain and the supply and discharge means for the chain conveyor can be arranged. (not drawn). However, this is also possible on another location in the apparatus.

The right-hand part 23 and the left-hand part 25 of the double Multispiral Tower according to FIG. 9 could also be executed "in duplicate" each having two "cylinders" (not drawn) in which the chain conveyor runs upwardly in the right-hand part over two cylinders along oblong shaped helical lines or ovals and in the left-hand part runs downwardly also over two cylinders along oblong shaped helical lines or ovals.

In the drawn embodiment of the chain conveyor the pivot 8', 8a between the rigid, rod-shaped element 6, 6' and the pulling element 7, 7' lies on the extremity of the rigid, rod-shaped element at a distance from the chain 2, 11, but it is also possible to arrange this pivot in any possible location between the extremities of the rigid, rod-shaped element 6, 6'.

As is indicated in FIGS. 1, 2 and 6, the conveyor according to the invention can be supported on the outside, i.e. near the free corner point of the triangular carriers 3 and 3' by a guiding and carrier rail 15. The rail 15, however, could have been applied at any possible location on the triangular carriers. The rail 15 mainly serves to support the weight of the carriers 3, 3' and the objects resting on it in order to prevent a torque moment from being exerted on the chain 1, 11.

I claim:

1. A chain conveyor, provided with a drive chain and with carriers mounted on the chain, said carriers being mounted on the links of the chain, characterized in that each carrier (3, 3') consists of a rigid, rod-shaped element (6, 6') being at one end pivotably mounted on a chain link (2, 12) and being, at a distance from the chain, pivotably connected to a pulling element (7, 7') which is pivotably connected at its other end to a chain link, lying at a distance from the first-mentioned chain link, in such a manner that a triangular carrier (3, 3') is formed, and that the bases of adjacent triangular carriers (3, 3') along the chain (1, 11) partially overlap each other.

2. A chain conveyor according to claim 1, characterized in that the pulling element (7, 7') is also a rigid, rod-shaped element.

3. A chain conveyor according to claim 1, characterized in that the pulling element (7) is flexible and the pivot (8") of the pulling element (7) on the chain (1, 11) precedes the pivot (8) of the rigid, rod-shaped element (6) on the chain (1, 11) in the direction of movement of the chain.

4. A chain conveyor according to claim 2, characterized in that the rigid, rod-shaped element (6') and the pulling element (7') have been interconnected at a distance from the chain (1) by a torsion spring (8a).

5. A chain conveyor according to claim 4, characterized in that the torsion spring (8a), the rigid, rod-shaped element (6) and the rigid pulling element (7') have been formed out of a single piece of the same material.

6. A chain conveyor according to claim 2, characterized in that the rigid, rod-shaped element (6) and the rigid pulling element (7) consists of oblong, metal strips.

7. A chain conveyor according to any of the preceding claims, characterized in that the pivot (8', 8a) between the rigid, rod-shaped element (6, 6') and the pulling element (7, 7') lies between the chain (2, 11) and the end of the rigid, rod-shaped element (6, 6') lying at a distance therefrom.

8. A chain conveyor according to claim 1, characterized in that the conveyor at the side of the carriers (3, 3') is supported at a distance from the chain by a guiding and carrying rail (15).

9. A chain conveyor according to claim 1, characterized in that additional, substantially sinusoidal or zigzag-shaped elements (6a) of rod-shaped material have been mounted on the rigid, rod-shaped elements (6').

10. A chain conveyor according to claim 9, characterized in that the additional elements (6a) have been made of round rod-shaped material and have been mounted on the rigid, rod-shaped elements (6') by means of spot welding.

* * * * *